(12) United States Patent
Kaye et al.

(10) Patent No.: US 7,144,212 B2
(45) Date of Patent: Dec. 5, 2006

(54) SELF-DRILLING HOLLOW WALL ANCHOR

(75) Inventors: Gordon E. Kaye, Garrison, NY (US); Nathaniel H. Garfield, Purchase, NY (US)

(73) Assignee: Mechanical Plastics Corp., Elmsford, NY (US)

( * ) Notice: Subject to any disclaimer, the term of this patent is extended or adjusted under 35 U.S.C. 154(b) by 0 days.

(21) Appl. No.: 11/001,945

(22) Filed: Dec. 2, 2004

(65) Prior Publication Data

US 2006/0120821 A1    Jun. 8, 2006

(51) Int. Cl.
*F16B 13/06* (2006.01)

(52) U.S. Cl. .................. 411/30; 411/80.1; 411/80.6

(58) Field of Classification Search .............. 411/29, 411/30, 80.1, 80.6, 415, 307
See application file for complete search history.

(56) References Cited

U.S. PATENT DOCUMENTS

| | | | |
|---|---|---|---|
| 2,419,555 A * | 4/1947 | Fator | 411/387.3 |
| 2,601,803 A * | 7/1952 | Newman | 411/80.1 |
| 4,322,194 A | 3/1982 | Einhorn | |
| 4,601,625 A * | 7/1986 | Ernst et al. | 411/387.4 |
| 5,039,262 A | 8/1991 | Giannuzzi | |
| 5,190,425 A | 3/1993 | Wieder | |
| 5,234,299 A | 8/1993 | Giannuzzi | |
| 5,267,423 A | 12/1993 | Giannuzzi | |
| 5,308,203 A | 5/1994 | McSherry | |
| 5,449,257 A | 9/1995 | Giannuzzi | |
| 5,482,418 A | 1/1996 | Giannuzzi | |
| 5,529,449 A | 6/1996 | McSherry | |
| 5,536,121 A | 7/1996 | McSherry | |
| 5,625,994 A | 5/1997 | Giannuzzi | |
| 5,626,245 A | 5/1997 | Kokenge | |
| 5,692,864 A | 12/1997 | Powell | |
| 6,079,921 A | 6/2000 | Gauthier | |
| 6,139,236 A | 10/2000 | Ito | |
| 6,164,884 A | 12/2000 | Mayr | |
| 6,186,716 B1 | 2/2001 | West | |
| 6,196,780 B1 | 3/2001 | Wakai | |
| 6,354,779 B1 | 3/2002 | West | |
| 6,382,892 B1 | 5/2002 | Hempfling | |
| 6,494,653 B1 | 12/2002 | Remmers | |
| 2005/0084360 A1 * | 4/2005 | Panasik et al. | 411/44 |
| 2005/0175429 A1 * | 8/2005 | Panasik et al. | 411/80.1 |

* cited by examiner

*Primary Examiner*—Flemming Saether
(74) *Attorney, Agent, or Firm*—Israel Nissenbaum

(57) ABSTRACT

A high strength failure-resistant hollow wall anchor having a self drilling threaded installation structure adapted to be broken, after positioning, by an inserted screw, into expandable anchoring elements. The anchoring elements engage internally formed cams and the distal surface of the wall into which the anchor is deployed and are comprised of a plastic sufficiently rigid to effect a threaded insertion and to be broken apart, but which plastic is also sufficiently flexible to be able to form the expansion anchor member on the distal surface of a wall. The anchor includes anti-rotation elements to retard overtightening and anchor removal prior to screw removal.

10 Claims, 1 Drawing Sheet

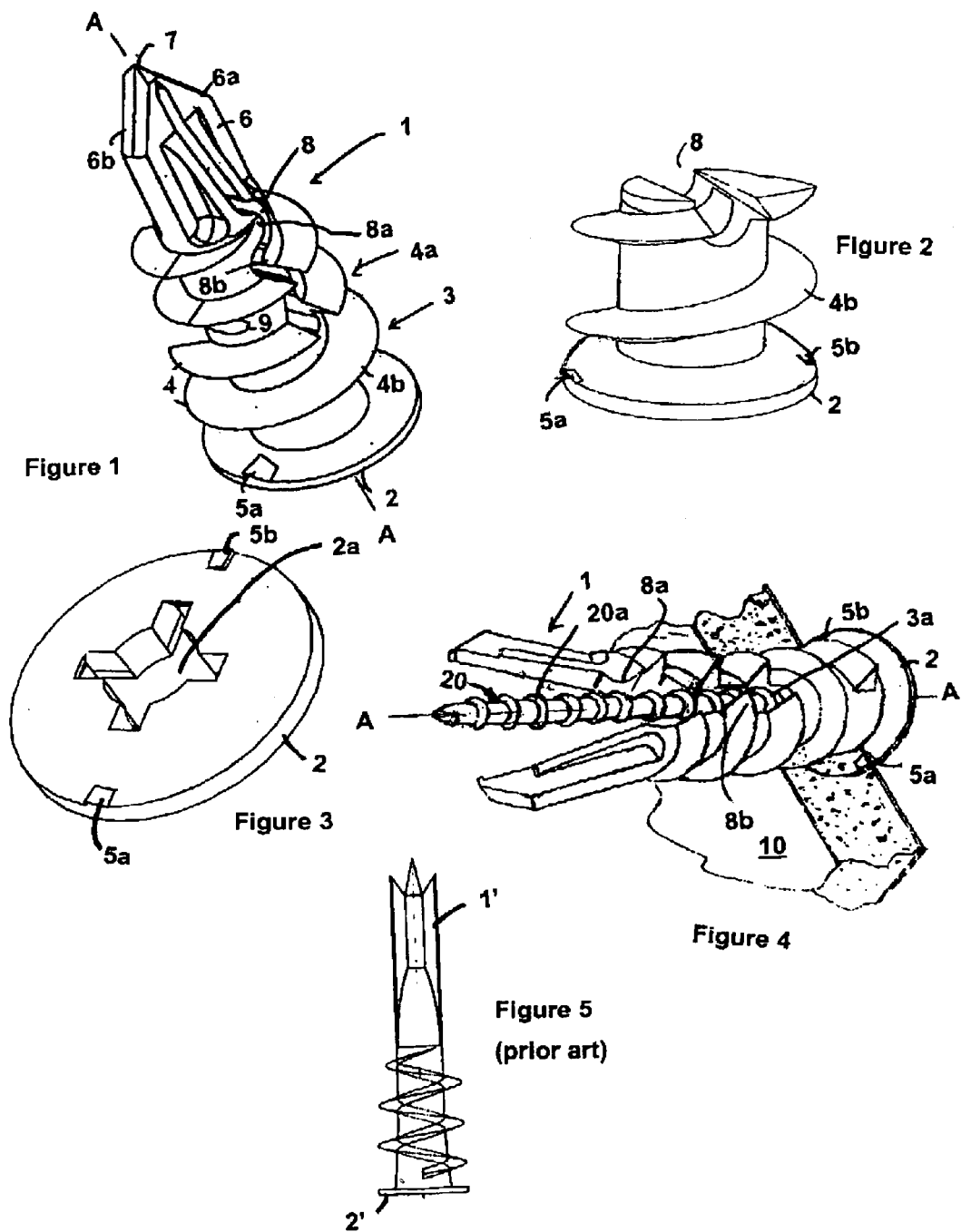

SELF-DRILLING HOLLOW WALL ANCHOR

FIELD OF THE INVENTION

This invention relates to anchors used in supporting articles on hollow walls and in particular the present invention relates to anchors having self-installing or self-drilling elements.

BACKGROUND OF THE INVENTION

Hollow walls, as commonly known, are interior walls generally comprised of gypsum board, plasterboard and the like, of specific thicknesses (generally ½" and ⅝"), mounted on studs. A hollow is accordingly formed behind the relatively thin outer surface materials and between the spacing studs. These walls are of limited structural integrity (e.g. gypsum board owes much of its strength to the paper used to enclose the compressed powder gypsum) and they will not adequately support items hung thereon with simply nails or even standard screws (except directly on the stud). Nevertheless, there is a need to hang decorative (e.g., paintings) and utility items (e.g., shelving), often in areas distant from the supporting studs. A class of hollow wall anchors have been developed which are used in conjunction with a nail or screw, to enhance holding strength. Common anchors of this type, however often have drawbacks. Thus, for example, plug anchors (made of metal, plastic or fiber), which are expanded by an inserted screw against the interior gypsum of the wallboard, still rely on a tenuous holding strength provided by compressed powdered gypsum. Other anchors include toggle bolt anchors which cannot be reused and which require pre-drilled holes for installation. Self-installing drive-in molly bolt anchors may damage a wall if not properly installed. Many of the hollow wall anchors are susceptible to loosening and failure, particularly with a dynamic load, e.g., removal and replacement of pictures, and typical wall vibration.

Two other types of hollow wall anchors are generally available for use with hollow walls for supporting loads. The first is the premier high holding strength expansion anchor, exemplified by the Toggler® anchor, which, when positioned, expands behind the inner surface of a wall, to spread the holding load against a greater surface of the wall. This type of anchor however requires a preformed or predrilled aperture for deployment.

A second type of anchor (available in both plastic and metal) is the auger type anchor (also known as self drilling or self installing screw anchor) comprised of a short metal or plastic rod having a single or multiple spike end and a base section with an oversize screw thread. With this anchor, the spike end starts the insertion positioning and boring until the screw threads engage the wall and the anchor is then self-threaded (by engagement with a screwdriver or more often with a screw gun) into the hollow wall gypsum until a front flange engages the wall. The threads provide all the holding strength of the anchor against the interior walls of the aperture being formed.

While placement of the auger anchors is rapid, without the need for a pre-drilled aperture (making them popular with some contractors), these auger anchors, rely only on the screw threads (albeit oversized) to retain the anchor in the wallboard. They are accordingly subject to problems, which can cause premature release under loads near their maximum ratings. This premature release can be caused by excessive torque upon installation (a common occurrence with a screw gun used without care during the installation process), allowing the threads to strip the softer internal plaster laminate or powdered gypsum, thereby weakening the holding strength. This interior disruption is however not discernable to the installer, making failure an insidious unknown. Even with proper installation, subsequent failure of the installation under load can also occur spontaneously over a longer period of time, as a result of vibrations normally occurring in building structures. Often, removal of an inserted screw can cause the anchor to unthread from the wallboard, along with screw, due to the frictional force of the screw thread being greater than that between the anchor and wallboard. This makes reloading the anchor unfeasible since the wall, at such point, has been effectively destroyed.

Recently, embodiments of such self installing anchors such as exemplified, for example in U.S. Pat. No. 5,692,864, have been provided with expandable segments of the forward non-threaded section, which engage the distal side of the wall with screw insertion, but which embodiments are not fully satisfactory with respect to enhanced holding strength and/or positive deployment.

SUMMARY OF THE INVENTION

It is an object of the present invention to provide a high strength failure-resistant hollow wall anchor having a self tapping or drilling threaded installation structure. This structure is adapted to be broken, after positioning, by an inserted screw, into expandable anchoring elements. The anchoring elements engage the distal surface of the wall into which the anchor is deployed. Such hollow wall anchors are comprised of a plastic sufficiently rigid to effect a threaded insertion and to be broken apart as described, but which plastic is also sufficiently flexible to be able to form the expansion anchor member on the distal surface of a wall. This anchor is also provided with mechanical elements for enhancing anchoring element flexibility.

It is still yet another object of the present invention to provide an anchor with an interrupted thread, which becomes misaligned, with screw insertion, to thereby retard threaded removal of the anchor.

It is an additional object of the present invention to provide the anchor with elements to retard or prevent overtightening with concomitant wall damage.

It still another object of the present invention to provide the anchor with at least one thread section, adjacent the head, of a larger diameter size and of a different pitch to further preclude over-tightening.

It is another object of the present invention to provide the anchor with position locking elements, which are activated with installment of a screw into the anchor during hanging of an object thereby. A positive indication of proper screw and anchor deployment is still another object of the present invention These and other objects, features and advantages of the present invention will become more evident from the following discussion and drawings in which:

SHORT DESCRIPTION OF THE DRAWINGS

FIG. 1 is an isometric view of the anchor of the present invention;

FIG. 2 is a close up isometric view of the threads of the anchor of FIG. 1 adjacent the head of the anchor;

FIG. 3 is an isometric inner view of the head of the anchor of FIG. 1 (with the body removed for clarity), depicting the drive and screw insertion area and anti-rotation lugs; and FIG. 4 is an isometric view of the anchor of FIG. 1 having been deployed on a hollow wall and wherein the anchor expansion elements are locked into position behind the wall with a deployed inserted screw; and FIG. 5 is a typical commercially available self-installing auger anchor of the prior art.

DETAILED DESCRIPTION OF THE INVENTION

Generally the present invention comprises a self-drilling hollow wall anchor comprising an elongated plastic body, preferably approximating the shape of a rod, having a central longitudinal axis, with a head member at one end and a drilling member at the other end. A longitudinal bore extends through the body and is adapted for threadingly receiving a screw therein (with insertion, the screw cuts a thread into the plastic). An axial flange is concentrically positioned relative to the plastic body at the first end, adjacent the head member.

The head member comprises longitudinally positioned and axially outwardly extending oversize (relative to standard screws) external threads, which are adapted for screwing deployment into the hollow wall. The anchor further comprises anchoring means distal to the wall, when the anchor is deployed therein, comprising connected but separable elements of the drilling member, and at least a portion of the threaded head member. The separable elements are partially connected and otherwise separated by a non-linear slot which interrupts at least one flight of the threads. At least two cam elements are formed by the non-linear slot and extend inwardly across the longitudinal axis from opposite sides of the slot. Such cams are preferably sinusoidal in configuration and preferably also progressively larger towards the drilling tip.

A central slotted opening is formed in the flange for engagement with a rotating driver such as a screwdriver or screw gun for threadingly driving the anchor into a hollow wall. The slotted opening is of known universal driver head configuration suitable for engagement with common blades, phillip heads, etc. The flange comprises means for preventing overtightening of the anchor in the hollow wall. The anchor also comprises means for preventing it from being threadingly backed out of the wall prior to removal of the screw from the anchor. Threading insertion of a screw causes the connected separable elements to separate into the anchoring means and the screw engages the cams to lock the separated separable elements into an anchoring position, with at least one flight of the threads thereby engaging a distal surface of the wall.

Preferably a short portion of longitudinal body, extending from the head of the anchor, is a unitary solid from which the separable elements extend. The anchor is comprised of a semi-rigid material which has sufficient rigidity to threadingly easily cut into typical hollow wall materials, while also being capable of providing a resistant holding on the distal side of the hollow wall material and sufficiently flexible to assume a holding position and to maintain it without splitting or cracking. The semi-rigid material preferably has a degree of abrasiveness whereby "wandering" of the anchor relative to a wall is minimized or eliminated prior to the screwing deployment and accuracy of anchor placement is enhanced.

The anchoring means comprises separable elements of anchor leg members adapted to be structurally unitary, to prevent impedance, during the drilling phase of installation. The anchor leg elements are adapted to be deformed in a rigidly spreadable manner or rearward expansion, behind the hollow wall and further comprise means for holding them together during self drilling anchor positioning. The anchor further comprises means for allowing the anchor leg members to be spread away from each other when a screw fastener is installed into the central aperture in body of the anchor, wherein the anchor leg members are compressed against the distal side of the wall. Subsequent withdrawal of the anchor from the wall is prevented by this rearward expansion. Since the threadable means on the anchor in the wall board laminate is not the main structural reason for anchor retention, even in the event that the threads are stripped in the substrate of the wallboard plaster (i.e. the powdered gypsum of the wallboard has been chewed up such as by overtightening), unlike prior art auger anchors, the spread of the rear extensions and holding therewith is sufficient to retain holding support and prevent extraction of the anchor. The installed screw spreads the sides of the anchor behind the wallboard in a locked manner. Comparative pull tests on prior art self drilling anchors and the self drilling anchors of the present invention show greatly improved holding power resulting from the rearwardly spreadable anchor elements of the latter, of about 15 to about 30% greater tensile pull-out depending on wall board thickness.

It is highly preferred that least one of the threads of the anchor of the present invention is interrupted, as part of the anchor leg separation, but with the threads being initially aligned for proper threading insertion. However, once the screw is inserted, the anchor expands and the threads become misaligned thereby. As a result, the misaligned threads bite into the non-threaded portion of the wall and removal of the screw from the anchor does not also result in the anchor being removed from the wall. Typically, the screw is tightly inserted into the anchor and removal of the screw also detrimentally removes the anchor. With the anchor of the present invention, the misaligned thread(s) retards or prevents removal of the anchor until the screw is entirely removed and the anchor is effectively re-usable.

In accordance with the present invention it is both the structure and material employed in this anchor design, which is responsible for this improved performance. The material must be hard enough to penetrate the hard surface of the wallboard, and not soften under the frictional heat caused by drilling action, while providing a non-brittle and moderately flexible ability to bend. Prior art anchors are either too soft to provide an effective self drilling auger thread or the anchors are too hard and do not provide the requisite flexibility required for the distal wall holding operation of the present invention.

For economic considerations polyamides and polyesters, both with about 15% glass filling by volume, are preferred since both types are readily moldable in conventional machines. Glass filling, depending on materials may be as little as 10% for effective rigidity but should not exceed 50% whereby the filled material becomes overly hard and brittle. It is noted that the polypropylene and polyethylene (without hardening fillers) used for some hollow wall anchors are insufficiently hard for providing cutting threads. It is understood that other materials having the requisite physical characteristics are also within the scope of the present invention. To facilitate flexibility of the anchoring element it is preferred that these elements be provided with at least one thinned axial section between screw thread of the anchor, which function as hinging areas. Different wall thicknesses are accommodated by appropriate thinned sections.

In a preferred embodiment of the present invention, the shape of the central slot, through which a fastening screw is inserted, comprises a cross section of an initially converging profile leading to two opposing cam protrusions. The slot extends to the tip where there is a small connecting tie bar between the abutted anchor leg elements. This allows for tip stability when drilling the anchor into the wallboard (i.e., it in effect becomes a drilling tip) but the tie bar is sufficiently small whereby a drilling point is maintained. In a preferred embodiment the cutting surface of the front of the anchor, which engages the wall, is provided with a blade thinning simulation to facilitate cutting during anchor insertion. The glass filling of the preferred material embodiment further provides sufficient abrasiveness to the material to prevent the "wandering" between a smooth anchor tip and a smooth wall, typical of prior art anchors. Accuracy of initial placement and ultimate anchor positioning is enhanced thereby The tie bar drilling tip is preferably designed to be partially destroyed (or abraded) in the process of insertion, to permit easy breakage during the expansion caused by screw insertion rather than simple stretching. This facilitated by the initial rigidity of the material. Because of the stiffness of the material, a perceptible popping sound is discernible with screw insertion indicating that the drilling tip has been snapped and the anchoring elements have moved into holding position. Failure to break the tie bar, such as with stretching of a flexible material, may prevent the anchor elements from being effectively positioned.

It is preferred that the slot be longitudinally sinusoidal or otherwise deviate axially from a longitudinal axis and that there is a crossing of the central longitudinal axis of the anchor. With separation of the anchor legs inwardly extending cam protrusions of the slot are accordingly formed. Engagement of an inserted screw with the cam protrusions increases the expansion of each side of the anchor, while acting as a locking device to prevent the collapse of the side extensions. Since the threads of the anchor of the present invention provide little of the holding power, they may be more compact then those of the more commonly produced augers in order to minimize wall integrity disruption. The threads are adapted to facilitate insertion, provide an initial retention for screw insertion, and act as position locking means when the expansion of the anchor occurs. At least one thread of the anchor extends beyond the inner surface of the wall wherein the thread is forced into biting engagement with the edges and periphery of the aperture on the inner portion of the wall, thereby enhancing holding strength. It is preferred that the final thread near the front external flange be larger than the ones ahead of it, and of a different pitch. This causes a jamming action when this thread is fully inserted (i.e., the paper of the wallboard is pinched between the thread and the flange) in order to help prevent turning of the anchor during threading (i.e., at the point of overtightening but not before) and unthreading of the screw. The outer surface of the anchor is preferably incised with a plurality of axially extending small grooves, which permit the side legs to bend more easily during expansion with screw insertion.

The retention capability of this improved anchor, however, does not rely on the externally threaded body of the anchor. It is designed to be structurally cohesive during the drilling phase of installation while being capable of deformation in a rigidly spread able manner behind the hollow wall, since the anchor legs spread when the screw fastener is installed. Subsequent withdrawal is prevented by this rearward expansion. The threadable means on the anchor in the wall board laminate is not the main structural reason for anchor retention, and even in the event that the threads are stripped in the substrate of the wallboard plaster, the spread of the rear extensions is sufficient to prevent extraction of the anchor. The installed screw spreads the sides of the anchor behind the wallboard in a locked manner.

The failure of prior art anchors and those of the present invention is actually the failure of the wall board, which is disrupted when a circular piece is pulled right out of the main surface. The spreadable anchor of the present invention however provides a larger, less concentrated bearing surface behind the wallboard, and is seen intact in this broken piece, while often, the prior art auger is pulled out of the wall board without causing breakage of the wall surface.

In a preferred embodiment of the present invention, the threaded portion of the length of the anchor from the inner surface of the flange comprises at least the thickness of common dry wall thickness of ½ to ⅝ inch plus at least an additional ⅛ to ¼ inch to provide the additional biting thread within walls of different thicknesses when the anchor legs are separated.

A common detrimental installation involves the excessive force used to install the threaded anchor beyond engagement of the flange with the outer wall surface. As a result, the wallboard gypsum surrounding the inserted thread becomes "chewed up" with significant loss of holding strength. Though such holding strength is not significantly relied upon with the anchor of the present invention, the flange of the anchor of the present invention is provided with overtightening prevention means. The inner surface of the wall engaging flange is provided with small protrusions or lugs which, upon engagement of the flange with the wall, bite into the wall and provide a perceptible drag on further tightening and an indication for the installer to stop. These same protrusions also provide a drag against anchor removal to further ensure that an inserted screw is removed before the anchor itself is removed from the wall.

DETAILED DESCRIPTION OF THE DRAWINGS AND THE PREFERRED EMBODIMENT

With reference to the drawings, in FIGS. 1–4, anchor 1 comprises driving flange 2 with longitudinally extending anchoring element 3 having helical threads 4 thereon. The threads are interrupted by a separation which extends from the flange 2 (as shown in FIGS. 1, 2 and 4) to the forward drilling section 6. Forward drilling section 6 is comprised of separable arms 6a and 6b which are held together by frangible tie bar 7. The arms 6a and 6b extend through the threaded section 4a and constitute most of the length of the anchoring element 3. Sinusoidal (or similar shape-deviating across the central longitudinal axis) through-slot 8 defines the separable arms 6a and 6b. Initial thread section 4a, adjacent the flange 2 is of wider dimension and offset pitch as compared to the other threads.

In use, the frangible tie bar 7 is placed and pressed against the wall 10 and the anchor is rotated clockwise, (typically with a screwdriver or screw-gun or drill, with tie bar 7 providing a drill member designed to pierce a gypsum wall. As seen in FIG. 3, front flange 2 is apertured with a key slot 2a adapted for engagement with a multitude of drivers (slot, Phillips, torque, etc.). As the anchor 1 penetrates the wall board 10, the helical screw thread 4 engages the gypsum wall board and the anchor is threaded into the wall until barb shaped anti-reversal lugs 5a and 5b bite into the wall board as the flange 2 comes into flush contact with the wall board (see FIG. 4). The lug engagement is a perceptible stop and signals the installer to stop tightening action of an installing tool at the point of detrimental overtightening.

A screw 20 (used for supporting items with the anchor) is threaded through aperture 3a (shown in dotted lines) along the central longitudinal axis A of the anchor, with the thread thereof 20a cutting into the walls of aperture 3a. Continued insertion of screw 20 places outward pressure on tie bar 7, via expansion of supporting arms 6a and 6b, until the tie bar snaps with a perceptible pop. This indicates to the installer that supporting arms 6a and 6b have separated and are being forced into peripheral supporting engagement with the inner edges of the aperture formed by the anchor. The threads of the screw 20 engage and lock with cam elements 8a and 8b formed by the non-linear slot 8, to maintain the supporting arms in fixed engaging position shown in FIG. 4.

Anchor threads 4 are sized to extend beyond the inner surface of the wallboard of varying thicknesses whereby a flight (shown as flight 4b) of the anchor bites into the adjacent inner surface of the wallboard, peripheral to the aperture formed by the anchor. This decreases anchor slippage and increases holding strength.

In order to help permit the relatively rigid (as required for the self threading) supporting arms 6a and 6b to move into the anchoring position described, without cracking or breaking, alternating groove sections or thinned areas 9 are formed in between flights of the threads 4 preferably with a residual thickness of at least ⅓ of the original. This structure, taken in conjunction with the flexible rigidity of the glass filled material, ensures proper operation without breakage.

A problem which arises with prior art plastic auger anchors 1', as shown in FIG. 5, is removal of an inserted screw for replacement of hanging items. Proper removal is dependent on the threaded bond between screw and anchor being less than that between the anchor threads 4' and the drywall. As is often the case with the reverse condition, the anchor itself is actually removed from the wall before the screw is removed from the anchor. However, once such anchor is removed from a wall, re-using the original hole is impractical since it has lost a significant portion of any holding capability with disruption of the drywall or gypsum material as a result of the original installation and the removal. Three features of the structure of the anchor of the present invention prevent this untoward occurrence. There is increased resistance for removal of the anchor from the wall engendered by the anti-rotation lugs 5a and 5b. Additionally, the oversized and differently pitched initial thread of the anchor 4b resists back-out. Lastly, with insertion of the screw, the interrupted threads 4 bulge and become misaligned and cannot readily track out of the originally formed thread.

As described above, another significant problem, with the use of the prior art anchors depicted, is the tendency for installers using power screw drivers to overtighten the auger on insertion. Though the flange 2' will stop with contact with the wall, since it is paper, a frequent occurrence is that the power driven flange will sink slightly into the wall and tear the paper or the anchor will rotate in place, churning up the gypsum around the auger threads. In either case, holding strength is compromised. Such untoward events are minimized with the anchor 1, by means of the anti-rotation lugs and the oversize thread 4b of different pitch which is threaded as the anchor is seated into proper position. Both features retard excessive overtightening, the former by acting as a stop and the latter requiring added exertion because the thread 4b will follow in the track of the initial threads. In any event, holding strength is determined by the distal wall surface resistance which was not affected.

It is understood that the above description and drawings are only exemplary of the present invention and that changes in structure, features, dimensions, materials and the like may be made without departing from the scope of the present invention as defined in the following claims.

What is claimed is:

1. A self drilling hollow wall anchor for deployment into a hollow wall, said anchor comprising an elongated plastic body having two ends on a central longitudinal axis, and a longitudinal bore adapted for threadingly receiving a screw therein, with the anchor comprising a head member at a first end of the plastic body and a drilling member with a drilling tip at the other end of the plastic body, the plastic body having an axial flange concentrically positioned relative to the plastic body at the first end adjacent the head member; wherein the head member, adjacent the flange, comprises longitudinally positioned and axially outwardly extending external threads adapted for screwing deployment into the hollow wall; wherein the anchor further comprises anchoring means adapted to be distal to the wall when the anchor is deployed in the wall, with the anchoring means comprising connected but separable elements of the drilling member, said separable elements being connected to each other at said drilling tip and at at least a portion of the threaded head member, with the separable elements being separated by a slot which interrupts at least one flight of the threads and wherein the slot is non-linear whereby at least two cam elements extend inwardly across the longitudinal axis adjacent to the portion of the threaded head member where said separable elements are connected; and wherein a central aperture is formed in the flange for engagement with a rotating driver for threadingly driving the anchor into a hollow wall and wherein the flange comprises means for preventing overtightening of the anchor in the hollow wall and the anchor comprises means for preventing the anchor from being threadingly backed out of the wall prior to removal of the screw from the anchor; said cam elements being positioned relative to said separable elements whereby threading insertion of the screw causes the connected separable elements to separate at said drilling tip into the anchoring means with the screw engaging the cam elements adjacent said portion of the head member and wherein the screw remains in said engagement with the cam elements to thereby lock the separated separable elements into an anchoring position with at least one flight of the threads thereby engaging a distal portion of the wall.

2. The self drilling hollow wall anchor of claim 1, wherein the anchor is comprised of a semi-rigid material having sufficient rigidity to threadingly easily cut into hollow wall materials, while also being capable of providing a resistant holding on the distal side of the hollow wall material by being sufficiently flexible to assume a holding position and to maintain it without splitting or cracking.

3. The self drilling hollow wall anchor of claim 2, wherein the semi-rigid material is comprised of a material selected from glass filled polyamides and polyesters, with the glass filling ranging from 10 to 50% by volume.

4. The self drilling hollow wall anchor of claim 2, wherein the semi-rigid material has a degree of abrasiveness whereby wandering of the anchor tip relative to a wall is minimized during placement of the anchor tip on the wall prior to the screwing deployment.

5. The self drilling hollow wall anchor of claim 2, wherein the separable anchoring elements are connected with a tie bar and wherein the semi-rigid material provides a perceptible pop upon proper screw placement, with breakage of the tie bar and positioning of the anchoring elements into proper anchoring position.

6. The self drilling hollow wall anchor of claim 2, wherein the drilling member comprises a cutting blade.

7. The self drilling hollow wall anchor of claim 2, wherein at least two sections between adjacent segments of the external threads are thinned, whereby the sections are on opposite sides of the slot and the sections comprise hinges to relieve stress on the semi-rigid material of the anchoring elements.

8. The self drilling hollow wall anchor of claim 2, wherein the means for preventing the anchor from being threadingly backed out of the wall prior to removal of the screw from the anchor comprises the flange being comprised of at least one extending lug on the surface of the flange being adapted to contact the wall, whereby the lug is of sufficient height to holdingly engage the wall upon contact of the flange with the wall, to thereby retard rotation of the anchor in either direction.

9. The self drilling hollow wall anchor of claim 2, wherein the means for preventing the anchor from being threadingly backed out of the wall prior to removal of the screw from the anchor comprises the first flight of the threads being adjacent the flange having a larger diameter relative to the other threads and being of a slight different pitch whereby threading of the anchor into the wall is not impeded thereby but wherein unthreading backing out of the anchor from the wall is impeded.

10. A self drilling hollow wall anchor for deployment into a hollow wall, said anchor comprising an elongated plastic body having two ends on a central longitudinal axis, and a longitudinal bore adapted for threadingly receiving a screw therein, with the anchor comprising a head member at a first end of the plastic body and a drilling member with a drilling tip at the other end of the plastic body, the plastic body having an axial flange concentrically positioned relative to the plastic body at the first end adjacent the head member; wherein the head member, adjacent the flange, comprises longitudinally positioned and axially outwardly extending external threads adapted for screwing deployment into the hollow wall; wherein the anchor further comprises anchoring means adapted to be distal to the wall when the anchor is deployed in the wall, with the anchoring means comprising connected but separable elements of the drilling member, said separable elements being connected to each other at said drilling tip and at least a portion of the threaded head member, with the separable elements being separated by a slot which interrupts at least one flight of the threads and wherein the slot comprises at least two cam elements with each extending from one of the separable elements to the other respectively; wherein said cam elements are positioned adjacent to the portion of the threaded head member where said separable elements are connected and wherein a central aperture is formed in the flange for engagement with a rotating driver for threadingly driving the anchor into a hollow wall whereby threading insertion of the screw causes the connected separable elements to separate at said drilling tip into the anchoring means with the screw engaging the cam elements adjacent said portion of the head member and wherein the screw remains in said engagement with the cam elements to thereby lock the separated separable elements into an anchoring position with at least one flight of the threads thereby engaging a distal portion of the wall; wherein the slot is non-linear and whereby the at least two cam elements extend inwardly across the longitudinal axis.

\* \* \* \* \*